United States Patent
Ohtsuka

Patent Number: 5,891,324
Date of Patent: Apr. 6, 1999

[54] ACID-CONTAINING ACTIVATED CARBON FOR ADSORBING MERCURY FROM LIQUID HYDROCARBONS

[75] Inventor: Kiyoto Ohtsuka, Bizen, Japan

[73] Assignee: Kuraray Chemical Co., Ltd., Bizen, Japan

[21] Appl. No.: 807,082

[22] Filed: Feb. 27, 1997

[30] Foreign Application Priority Data

Mar. 4, 1996 [JP] Japan .................................. 8-075325

[51] Int. Cl.⁶ ........................... C10G 25/02; B01J 20/20; C01B 31/08
[52] U.S. Cl. .................. 208/251 R; 208/299; 208/307; 585/820; 585/823; 210/688; 210/690; 210/914; 502/416; 502/417
[58] Field of Search ................... 502/416, 417; 208/251 R, 299, 307; 585/820, 823; 210/688, 690, 914

[56] References Cited

U.S. PATENT DOCUMENTS

| | | | |
|---|---|---|---|
| 1,788,466 | 1/1931 | Lourens | 502/417 |
| 5,202,301 | 4/1993 | McNamara | 502/417 |
| 5,336,835 | 8/1994 | McNamara | 502/417 |
| 5,372,619 | 12/1994 | Greinke et al. | 502/417 |
| 5,710,092 | 1/1998 | Baker | 502/417 |
| 5,736,053 | 4/1998 | Ikushima et al. | 210/688 |

*Primary Examiner*—Walter D. Griffin
*Attorney, Agent, or Firm*—Oblon, Spivak, McClelland, Maier & Neustadt, P.C.

[57] ABSTRACT

An activated carbon based adsorbent carrying an acid is provided for eliminating mercury or mercury compounds contained in hydrocarbons. Preferably the activated carbon base is provided with more than 80 ml/g micropore volume having radii less than 8 angstroms. Preferably the acid carried on the activated carbon is hydrochloric acid, sulfuric acid, or phosphoric acid. Hydrochloric acid is most preferred. The active carbon base is preferably manufactured by activating a carbonaceous material in an atmosphere comprising less than 30 vol. % water vapor. The adsorbent can be used to eliminate mercury or mercury compounds contained in hydrocarbons by contacting the adsorbent with the hydrocarbons in liquid phase. Particular hydrocarbons include naphtha and intermediates of oil products or petrochemical products. Minimal amounts of carried acid are desorbed from the adsorbent to the hydrocarbons. The adsorbent is useful to treat hydrocarbons in the oil industry to prevent possible harmful amalgamation due to mercury.

10 Claims, No Drawings

ACID-CONTAINING ACTIVATED CARBON FOR ADSORBING MERCURY FROM LIQUID HYDROCARBONS

BACKGROUND OF THE INVENTION

1. Field of the Invention

This invention relates to an activated carbon based adsorbent for mercury or mercury compounds contained in liquid hydrocarbons, more particularly to activated carbon based adsorbents and methods for adsorbing and eliminating small amounts of mercury or mercury compounds (hereinafter often simplified to "mercury") contained in liquid hydrocarbons, for instance naphtha and intermediates of oil products or petrochemical products.

2. Description of the Related Art

Heretofore, alumina based catalyst carrying palladium, for instance, has been used for the hydrogenation process of reforming liquid hydrocarbons, such as naphtha. The hydrogenation reaction on the catalyst suffers if impurity mercury or mercury compounds are present in the liquid hydrocarbons.

Mercury lends to readily form amalgams with many kinds of metals. For such reason, if an apparatus constructed from aluminum based alloys is involved in such process, there is harmful risk of corrosion due to amalgamation with mercury. Accordingly there has been strong desire for progress in the elimination of mercury from such liquid hydrocarbons.

There has been reported an adsorbent for mercury, based on a porous adsorbent carrying sulfur, that eliminates mercury by chemical reaction between mercury and sulfur. Further physical adsorption involving no chemical reaction with use of a porous adsorbent such as activated carbon, zeolite, or alumina is feasible to eliminate inorganic mercury in hydrocarbons. However, this method has problems such as inferior performance in mercury elimination rate when the adsorption performance decreases at a mercury concentration less than 10 bbp.

In the art disclosed heretofore concerning the adsorbent carrying sulfur, the sulfur carrying activated carbon is, for example, prepared by mixing activated carbon with fine sulfur particles and heating such mixture at 110°–400° C. (Japanese patent Application laid-open No. 59 78915/1984); and can be activated carbon carrying organic sulfur compound (Japanese Patent Application laid-open No. 62-114632/1987). Therein, as the sulfur compound, the use of solid sulfur or an organic sulfur compound such as thiophene is typical. Such porous adsorbents carrying a sulfur compound have been intended mainly to eliminate mercury from gases, rather than from liquid hydrocarbons.

Further, such art does not intend to inhibit dissolution or dessorption of the sulfur carried by the adsorbents into the liquid hydrocarbon as contamination, in addition to eliminating mercury. Liquid hydrocarbons are mostly subjected to hydrogenation at the stage of intermediate product wherein the contaminant or impurity sulfur contained in such hydrocarbon would give serious damage to the catalysts for hydrogenation. Thus there are deficiencies in the known art.

SUMMARY OF THE INVENTION

An object of the invention is to provide an adsorbent and method for effectively adsorbing and eliminating mercury contained small amounts in liquid hydrocarbons including an oil product or the intermediate thereof, for instance naphtha, without dissolution of a contaminant as sulfur into the hydrocarbons.

My studies on the art heretofore disclosed concerning elimination of mercury contained in small amounts in liquid hydrocarbons including the oil product or intermediate, for instance naphtha, proves that the activated carbon carrying sulfur or organic sulfur compounds does not inhibit dissolution of carried sulfur compounds into liquid hydrocarbons as far as the process is performed in liquid phase. The dissolution ranges from 10 to 400 ppm. Naphtha containing such sulfur concentrations would seriously damage catalysts used in a subsequent process. Thus the art known is conclusively limited to the gaseous process only, but unacceptable for the liquid process.

Studies based on the activated carbon not carrying either sulfur or sulfur compounds have been made. Then, as is known, the activated carbon is a kind of unique material having remarkably developed micropore structure and is active as a non-polar adsorbent sorbent of nearly all substances. The activated carbon exhibits a certain degree of adsorption to inorganic mercury dispersed in a solution, and the adsorption of such mercury is fairly successful in the case of activated carbon having a limited micropore structure, but the activated carbon having such structure with no carrier effect is proved to be unsuccessful to adsorb and eliminate inorganic or organic mercury contained in a slight amount in liquid hydrocarbons to such extent that no harm would substantially ensue in subsequent oil process.

My studies on activated carbon carrying various substances proves that carrying hydrochloric acid is found to be remarkably superior to the activated carbon with no carrier. In the subject application, superior adsorption is confirmed of inorganic and organic mercury in liquid phase, but also of such mercury present in small amounts. Further it is confirmed that where hydrochloric acid is carried in excess in the preparation, such excess hydrochloric acid can be drained out in the preparation stage and undrained or carried hydrochloric acid will not dissolve or desorb into the liquid phase in the applied adsorption process.

The studies confirm the effectiveness of acids other than hydrochloric acid. Further studies on micropore volume as well as micropore distribution suitable to adsorbing and retaining the acids including hydrochloric acid sustain the present invention.

The present invention provides an adsorbent carrying an acid for adsorbing mercury contained in liquid hydrocarbons, wherein the activated carbon has preferably a micropore volume of more than 80 ml/g defined by the micropores whose radii are less than 8 angstroms. Herein, the micropore volume is defined as adsorption volume of nitrogen gas measured by the instrument BFL, SORP which is converted to a volume of gas at standard conditions. This value will be referred to as micropore volume. Where the micropore volume defined by adsorbed gas volume may be expressed by denotation in liquid nitrogen, this conversion will be obtained by assuming that 1 ml of nitrogen gas at standard condition, is equivalent to 0.001555 ml of liquid nitrogen.

As for choice of acid carried by the activated carbon, preferred is hydrochloric acid, sulfuric acid, or phosphoric acid, and hydrochloric acid is the most preferable. As for the activated carbon, the preferred preparation is such that carbonaceous material is activated under a condition including a water vapor content at less than 30 volume % (hereafter a gas composition is expressed by volumetric percentages and often denoted by simply %) and cooled down under 300° C. in the same atmosphere, or the activated carbon obtained by usual process is subjected to treatment under nitrogen gas or carbon dioxide gas with substantially no oxygen and/or water vapor at a temperature higher than 500° C. and cooled down under 300° C. in the same atmosphere.

The present invention includes a preferable method of adsorbing and eliminating mercury contained in a slight amount in hydrocarbons including an oil product or intermediate thereof, such as naphtha, by containing the activated carbon carrying an inorganic acid in a liquid phase.

DETAILED DESCRIPTION OF THE INVENTION

The mercury adsorbent of the invention comprises the activated carbon carrying an acid, and the base material of activated carbon is provided with a specific surface of not less than several hundreds square meters per gram and broadly speaking, a carbonaceous material having high adsorplivity is acceptable. Source materials include carbonized product of coconut shell, phenol resin, and the like or coal. Activation methods include such a process as employing a high temperature with water vapor or carbon dioxide, or zinc chloride, phosphoric acid, concentrated sulfuric acid treatment.

As for the form, any form of crushed particle or granule is effective, but in view of pressure drop, adsorption capacity, and handling convenience in exchange of charged loads in field work, particle or granule form is preferable. The granules are manufactured as usual by blending 100 parts of the carbonaceous material with 30–60 parts of oil pitch, coal tar or resin, and by kneading, and molding followed by activation. The activated carbon thus obtained is a uinique material acting as a non-polar adsorbent exhibiting superior adsorption meeting nearly all liquid or gaseous objectives.

The present invention employs the activated carbon carrying an acid wherein the acid is not limitative and a variety of inorganic and organic acids exhibit the subject effects wherein preferred is one which adsorbs a large amount of mercury and which will not let the acid dissolve or dessolve into liquid hydrocarbons during application or will not cause any chemical changes. These considerations endorse hydrochloric acid, sulfuric acid, phosphoric acid, and the most preferable is hydrochloric acid.

Improvement in the mercury adsorption attained by the activated carbon carrying hydrohiloric acid as compared with the activated carbon with no carrier is shown in Table 1, appearing in the following. Example 1 and Comparative Example 1, appearing in the following, show mercury concentrations contained in light naphtha and mercury adsorptions nearly at equilibrium adsorption. The data shows that, in the case of mercury concentrations at 100, 10, 1 $\mu$g g/kg, adsorbed mercury is 0.95, 0.64, 0.38 mg/g by the activated carbon carrying hydrochloric acid and 0.14, 0.03, 0.01 mg/g by the activated carbon carrying no hydrochloric acid. This shows the mercury adsorption by carrying hydrochloric acid is improved 7, 21, and 38 times, respectively. Based on the same carrier, the superiority in mercury adsorption resulting from carrying hydrochloric acid on activated carbon is made clear as compared with carrying nothing.

It is remarkable that the improvement in the adsorption is superior in the case of a lower mercury concentration in naphtha, and this result shows the inventive adsorbent meets the object of the present invention in view of the fact that mercury concentrations contained in the liquid hydrocarbons are exceeding low.

Improvement brought by carrying an acid other than hydrochloric acid, for instance, sulfuric acid, phosphoric acid, is shown in Example 11 (sulfuric acid) and Example 13 (phosphoric acid) in Table 3.

With respect to prevention of the carried acid from desorption, the prevention by washing out or removal of excess acid after adsorbing an inorganic acid including hydrochloric acid, sulfuric acid, phosphoric acid is feasible, such inorganic acid molecules adsorbed inside micropores of the activated carbon structure are so strongly combined that such acid molecules do not readily desorb or become free. This feature is particularly remarkable with molecules of hydrochloric acid which have such a small molecular size. This acid is highly resistant to desorption or liberation into liquid hydrocarbons. On the other hand, it is necessary to wash out excess acid after adsorption thereof to avoid the acid desorption which will cause possible troubles in subsequent processes. Hydrochloric acid is the most preferable in consideration of a minimal tendency of desorption and superior performance in the mercury adsorption.

Turning to the requirement for the activated carbon, a broad range in properties is acceptable. However, some difference in performance is found wherein the mechanism taken by the activated carbon carrying hydrochloric acid in adsorbing mercury is unknown. Nevertheless, the studies on the relationship between the specific surface area, micropore volume, distribution of the micropores of the activated carbon and the mercury adsorption proves that the mercury adsorption is sharply correlated to a proportion of the micropore volume having smaller micropore radii.

In Examples 1, 2, and 3, employed are activated carbons having nearly the same micropore volume but different proportions of the micropore volume having radii less than 8 angstroms which ranges from Example 1 (largest proportion) to 2 and 3. The results indicate that the proportion of the micropores having radii less than 8 angstroms is significant. That is, it is presumed that mercury is mainly adsorbed into micropores having less than 8 angstroms. In view of other results, preferred is the activated carbon provided with the micropore volume at more than 80 ml/g having the micropore radii less than 8 angstroms.

Turning to the descriptions about more detailed operations related to the present invention.

As for the activated carbon base carried with hydrochloric acid, a broad range is acceptable and the usual manufacturing process therefor is already noted. Therein, a general tendency is such that when a degree of activation is made higher, a volume of micropore having smaller radii decreases. The activation conditions are influential to increase in the total micropore volume and to produce the accompanying decrease in the smaller micropore proportion.

As noted before, preferred is the activated carbon provided with the micropore volume at more than 80 ml/g having the micropore radii less than 8 angstroms. In the present invention, measurements on the micropore distribution and micropore volume of activated carbon bases are done by the instrument commercially named: BEL SORP, Type 28 SA manufactured by JAPAN BEL INC. and calculated based on the adsorption isotherm line for nitrogen gas. There by tie measurable lower limit for the micropore radii is at 3–4 angstroms and upper limit is at 60–70 angstroms. Normally the activated carbon has the total micropore volume at 100–500 ml/g and the average radius at 12–14 angstroms, and accordingly the invention prefers the activated carbon having a high proportion of the micropore volume provided with smallest radius range. Therefore, advisable activation conditions are those for depressing the tendency of enlarging the average micropore radii while enhancing the total micropore volume.

The activation gas for manufacturing the activated carbon normally contains water vapor and carbon dioxide gas and the present invention does not limit the content of carbon dioxide, but prefers the water vapor content less than 30%. Normally the water vapor not less than 40–60% is employed, since the activation rate brought by water vapor is largely higher than that by carbon dioxide and thus a gas composition is set to have more water vapor content. Compared with the normal condition, the present invention prefers a mild condition with slower activation rate.

Table 1 and Examples 1–5 in the following show that the activated carbon activated under the condition including a higher water vapor content contains less micropore volume having micropore radii less than 8 angstroms and in turn performs inferior mercury adsorption.

The detailed mechanism is unknown for why the activation condition containing less water vapor content improves the mercury adsorption, but it is presumed that such an activation condition should provide for such internal structure that the micropore having smaller radii accounts for large proportion, and such micropore portion contributes to the mercury adsorption. In order to increase the micropore volume having micropore radii less than 8 angstroms, preferred is to set the condition including the water vapor content at less than 15% in the activation gas and to depress lowering the micropore volume having radii less than 8 angstroms, and further preferred is the condition to increase the activation degree.

The present invention prefers, after the activation, cooling the activated carbon under the gas composition unchanged or similar to that for the activation until under 300° C. and then taking the activated carbon out from the system. Herein, the cooling gas composition unchanged or similar to that necessary to the activation means nitrogen gas, carbon dioxide gas or mixture thereof or such as substantially contains no oxygen and/or water vapor, and accordingly this requirement does not means that the activation gas and the cooling gas should have the same composition, and "substantially contains no oxygen and/or water vapor" means such gaseous condition as does not permit existence of oxygen atoms combined on the micropore surface of the activated carbon, in other words, condition containing oxygen and water vapor at less than 1–2%.

Further, the activated carbon preferred in the invention is obtained by conversion from the one obtained by the normal or usual activation condition. That is, such normal activated carbon is heated in a gas composition used for the above mentioned preferable activation condition, to a temperature higher than 500° C. and cooled under 300° C. in the same gas. Herein, the upper limit of the heat treatment temperature is not limitative, however, it is preferred less than activation temperature, usually more than 850° C. Then, "activated carbon obtained by normal or usual condition" means the one which was activated in such a atmosphere as contains water vapor at higher than 15% and which is thereafter cooled and taken out into air before enough cooling down.

In the previous description about the conversion, treatment time of the normal activated carbon depends upon a temperature wherein 500° C. prefers 20–180 min. and 800° C. prefers several min. This conversion is thought to bring about such effect due to sintering or shrinkage of micropores which comes from the heat effect to carbonaceous structure wherein the employment of the heat treatment under such circumstance as noted is based on the thought that such would prevent loss by oxidation on the carbonaceous surface and enhance the shrinkage in micropore radii.

As for the form of the activated carbon, any form in powder, crushed, pellet, particle, fibrous, or honeycomb form is acceptable. The granular or molded form is manufactured as usual by blending 100 parts of the carbonaceous material with 30–60 parts of oil pitch or coal tar as binder, and by kneading, and molding followed by activation.

The step of carrying or adsorbing an acid to the activated carbon thus obtained is feasible by immersing the activated carbon mass into an acid solution of interest and letting the acid adsorb into micropores and thereafter by washing out excess acid component by water or organic solvent for removal. In the case of an inorganic acid, such as hydrochloric acid, concentration of the solution is not limitative, but 0.1N to 3N (normality) is suitable. As for adsorption method, in addition to immersing into a solution as noted, impregnation by spraying of such acid solution like a shower may be employed.

It is requisite to remove unadsorbed or excess inorganic acid, such as hydrochloric acid, from the activated carbon base after the carrying process. The presence of unadsorbed acid would invite dissolution thereof into liquid hydrocarbons and give damage to the catalysts used in the subsequent oil process or cause harmful corrosion due to amalgamation. The washing out is feasible by mild stirring a water or organic solvent based solution, wherein the activated carbon is immersed. Thereafter, the activated carbon carrying acid may be packed into an adsorption tower after sufficient drying or at the state of containing water at about 50%. Otherwise, after packing such activated carbon into the adsorption tower, back washing by an organic solvent is permitted lo remove the excess acid.

As noted hereinbefore, the importance in the invention lies in the micropores having radii less than 8 angstroms. Acid molecules adsorbed in such micropores will not desorb or dissolve out by washing in water or organic solvent, further such acid molecules at the state adsorbed in the micropores will perform the superior adsorption for mercury and scarcely desorb through contact with liquid hydrocarbon.

In the process of adsorbing hydrochloric acid, for instance, immersing the activated carbon mass into 1–2N. Hydrochloric acid solution for about 1 hour is enough to perform the adsorption noted and in turn the hydrochloric acid molecules are so strongly combined by the adsorption that such molecules after the washing noted would not desorb through contact with liquid hydrocarbons. Test result concerning the desorption during immersing into distilled water for long periods of time show trace amounts or less than 1 mg/g desorbed as Examples 1–5 show. It is thought that hydrochloric acid for the reason of its small molecular size is suited to be caught in exceedingly small pores. In view of these results, hydrochloric acid is the best in the inorganic acids.

When the activated carbon carrying acid is immersed in distilled water, though the acid molecules are combined strongly, the pH value reading decreases a little, and this decreases pH indicates that the carried substance is an acid. This decreases in pH becomes clearer if temperature is raised more than 60° C. This phenomenon is thought to be a result of the nature of a strong acid if there is only a trace amount thereof. Normally the activated carbon is manufactured from carbonaceous material including coconut shell, coal or charcoal, and plant tissues generally contain a trace amount of potassium, sodium and other metallic compounds, and these are changed to oxides, for instance potassium oxide, through carbonization and activation processes, and such will produce metal hydroxide in contact with water and as a result, pH value would be led to about 9–10.

Further, in the case of phenol resin as starting material, such activated carbon shows a weak acidity in pH value when immersed in distilled water, but this acidity is nearly equal to reading that of distilled water when left in air for long time and its pH tends to acidic region, due to dissolution of carbon dioxide contained in air, and in the case of the phenol resin will not drop further in pH value. However, the activated carbon carrying hydrochloric acid or sulfuric acid tends to drop under pH 6.5 when immersed in distilled water for long time. Accordingly, the identification of carrying acid can be readily done by measuring the pH value immersed in distilled water.

There is no limitation about the choice of acids carried on the activated carbon base, but preferred is as noted before an inorganic acid including hydrochloric acid, sulfuric acid or phosphoric acid, or mixture thereof, and the most preferred is hydrochloric acid.

The present invention includes the method of eliminating mercury contained in hydrocarbons. Herein, the hydrocarbon means a broad range of hydrocarbons which will be subjected to elimination of mercury by a solid-liquid contact process with a mercury adsorbent in solid form, in particular mainly naphtha and intermediates of oil products or petrochemical products. Typical is naphtha or other intermediate which is composed of hydrocarbons having about 6–15 carbon atoms and present in liquid phase at ambient temperature, and in addition, liquefied hydrocarbons derived from oil (petroleum) or coal may be applied to the method of the present invention.

Further, hydrocarbons having not more than 5 carbon atoms including natural gas, ethylene, propylene are in gas form at ambient temperature, but these resources may be handled in liquefied form under pressure. Such liquefied hydrocarbons may also be applied to the present method, and such hydrocarbons present in gas form at ambient temperature may be converted to liquid state and then such may be applied to the present method.

In particular, liquefied hydrocarbons having not more than 5 carbon atoms including liquefied natural gas (LNG), liquefied petroleum gas (LPG), liquefied ethylene, liquefied propylene, and naphtha, are commercially handled in liquid phase and such liquid hydrocarbons may he applied to the adsorbent of the present invention. Thus remarkable industrial merit will be awarded. The objective liquid hydrocarbon may be a simple one component or a blend of a plurality of such components.

The method for eliminating mercury may be applied to any form of mercury contained in liquid hydrocarbons, and such includes solid mercury, inorganic mercury compounds, and organic mercury compounds, and there is no limitation concerning concentration, that is, the present invention may be applied to hydrocarbons containing, a trace or exceedingly small amount of mercury. Naphtha usually contains mercury al 0.002–10 mg/kg and such a slight level is suited to the present invention which employs the method of adsorption. In field practice of eliminating mercury, a preferred pretreatment filters the liquid hydrocarbon to remove the sludge contained therein together with mercury removable by the filtration as a sludge component.

The present method for eliminating mercury is advantageously feasible in a process employing an adsorption tower packed with the activated carbon in the form of a fixed bed, wherein a preferred particle size ranges from 4.75 to 0.15 mm, more preferably 1.70 to 0.50 mm.

When mercury concentration in a hydrocarbon is at 100 $\mu$g/kg, the necessary mass of the activated carbon depends upon the allowable concentration at an outlet part and the kind of adsorbent. However, roughly stated, 0.1–10 g of mercury may be eliminated with use of 1 kg of the adsorbent.

As described above, the inventive activated carbon based adsorbent is capable of almost completely eliminating small amounts of mercury contained in hydrocarbons by solid-liquid contact with the liquid hydrocarbons, and the hydrochloric acid carried on the activated carbon scarcely desorbs into the hydrocarbons. Thus the invention is suitable to treatment of naphtha and intermediates of oil products or petrochemical products.

EXAMPLE

The invention will be further described by the following examples.

Example 1

Coconut shells were carbonized to a carbonaceous substance and then crushed to 4–10 mesh (particle size ranges from 1.7 mm to 4.75 mm) which was used as raw material to prepare the activated carbon base in particle form. This carbonized material was activated at 900° C. by combustion gas for liquefied petroleum gas (gas composition: nitrogen 70%, oxygen 0.2%, carbon dioxide 19.8%, water vapor 10%) and cooled in the same gas to under 300° C. The activated carbon was crushed to the particle size from 10 to 32 mesh (particle size ranges from 0.5 mm to 1.7 mm). The activated carbon thus obtained had an ash component (residue after strong incineration) of 2.5 wt. %.

The activated carbon particles obtained above were vacuum deaerated and measured of the adsorption isotherm line in nitrogen gas by the instrument (BEL SORP Type 28 SA, JAPAN BL INC.) and the total micropore volume and radius distribution of the micropores were calculated. The total micropore volume was 279 ml/g and the proportion of micropore volume having radii less than 8 angstroms was 43% . That is, the micropore volume is 120 ml/g. As noted before, herein the micropore volume is always denoted by conversion from the nitrogen gas adsorbed amount to the volume at the standard condition. If converted to the volume of liquid nitrogen, the total micropore volume is 0.434 ml/g and the micropore volume having radii less than 8 angstroms is 0.187 ml/g.

Then, the activated carbon particles were immersed in 1N hydrochloric acid aqueous solution for 1.5 hr at room temperature and then washed with distilled water and dried at 110° C. for 12 hrs, and then washed with light naphtha ($C_6$ to $C_9$ hydrocarbons).

Mercury adsorption was measured at various mercury concentrations by contacting the activated carbon carrying hydrochloric acid with light naphtha containing mercury and mercury compounds, wherein organic mercury accounts for 20% of the total mercury contained in the light naphtha. The adsorbent active carbon (10 g) was immersed in the light naphtha with mild stirring and after 2 hr. residual mercury concentration in the naphtha and mercury adsorption by the active carbon were measured. The mercury adsorption performance was evaluated by measuring mercury adsorbed by the activated carbon at naphtha mercury concentrations: 100, 10, 1 μg/kg. Quantitative determination of mercury was made by atomic adsorption analysis.

Table 1 shows a description of the activated carbon carrying hydrochloric acid and the results of mercury adsorption. Under the condition which was thought to be at nearly equilibrium, the adsorbed mercury is: 0.95, and 0.38 mm/g for mercury concentrations of 100, and 1 ng/kg, respectively. This result shows that the subject activated carbon has superior mercury adsorption. Further, no organic mercury was found in the subject naphtha after the adsorption, that is, all organic mercury was adsorbed by the subject activated carbon.

Note: In the Table, organic mercury adsorption is ranked: ○ is good, X is fail and overall mercury adsorption is ranked: ◎ is superior, ○ is good, Δ is employable, X is fail.

mercury adsorption. The result is shown in Table 1, wherein pH value when the subject activated carbon was immersed in distilled water was 8.8.

The adsorbed mercury amount is exceedingly low as compared with example 1. The adsorbents employed in Examples 2–5 have smaller volume of the micropores having radii less than 8 angstroms as compared with the adsorbent employed in Comparative Example 1 but the mercury adsorption performed by Comparative Example 1 is lower than that by Examples 2–5. This shows that the carrying hydrochloric acid has large effect in the mercury adsorption.

Examples 6 and 7

Herein the same carbonaceous material as in Example 1 was employed to prepare the activated carbon base, but in the activation process different conditions were employed. That is, Example 7 was subjected to milder or lower

TABLE 1

| | | Material of Activated Carbon | Activation Gas (Vol %) $H_2O:CO_2:N_2:O_2$ | Total Micropore volume (ml/g) | Micropores having radii less than 8 angstroms | | Substance Carried on Activated Carbon | Mercury Adsorption, by Adsorbent (mg/g) | | | | Substance Dissolved into Naphtha (mg/Kg) | Overall Adsorption Performance |
|---|---|---|---|---|---|---|---|---|---|---|---|---|---|
| | | | | | Volume Proportion (%) | Volume (ml/g) | | Mercury Content in Naphtha (100 μg/Kg) | Same as left (10") | Same as left (1") | Adsorptivity of Organic Mercury | | |
| Example | 1 | Coconut Shell | 10:19.8:70:0.2 | 279 | 43 | 120 | HCl | 0.95 | 0.64 | 0.38 | ○ | Cl⁻ 1> | ◎ |
| " | 2 | Coconut Shell | 30:19.8:50:0.2 | 282 | 38 | 107 | HCl | 0.73 | 0.51 | 0.28 | ○ | Cl⁻ 1> | ◎ |
| " | 3 | Coconut Shell | 45:19.8:35:0.2 | 284 | 25 | 71 | HCl | 0.55 | 0.41 | 0.19 | ○ | Cl⁻ 1> | ○ |
| " | 4 | Coconut Shell | 55:19.8:25:0.2 | 280 | 15 | 42 | HCl | 0.31 | 0.19 | 0.08 | ○ | Cl⁻ 5 | Δ |
| " | 5 | Coconut Shell | 65:19.8:15:0.2 | 275 | 8 | 22 | HCl | 0.20 | 0.08 | 0.04 | ○ | Cl⁻ 30 | Δ |
| Comparative Example | 1 | Coconut Shell | 10:19.8:70:0.2 | 279 | 43 | 120 | – | 0.14 | 0.03 | 0.01 | X | — — | X |

Examples 2 to 5

The activation process herein employed activation gases having different water vapor contents: 30% (Example 2), 45% (Example 3), 55% (example 4), 65% (Example 5). Otherwise all 5 conditions were kept the same as those employed in Example 1, and thereby the activated carbon was prepared and subjected to the step of carrying hydrochloric acid and washed with distilled water and light naphtha. Thus adsorbents of activated carbon carrying hydrochloric acid were obtained, and these were applied to the same mercury adsorption test as noted in Example 1.

Table 1 shows a description of the activated carbons carrying hydrochloric acid and the results of mercury adsorption. The results indicate that the water vapor content in the activation gas increases with decrease in the micropore volume of the micropores having radii less than 8 angstroms and its proportion in the total micropore volume. As for the mercury adsorption, each adsorbent performs mercury adsorption, and the adsorbed amount decreases with decrease in the volume of micropores 20 having radii less than 8 angstroms.

Comparative Example 1

The adsorbent composed of the activated carbon prepared in Example 1 and with no carrier was employed to test the activation to prepare the activated carbon base provided with the micropore volume having radii less than 8 angstroms at 82 ml/g. Example 6 was subjected to stronger or higher activation to prepare the activated carbon base provided with the micropore volume having radii less than 8 angstroms at 108 ml/g. The steps taken subsequently were carrying hydrochloric acid and washing, drying to finish the activated carbon carrying hydrochloric acid. The mercury adsorption test was carried out in the same way as in Example 1.

A description of the activated carbons carrying hydrochloric acid and result of the mercury adsorption are shown in Table 2. Example 7 employed lower activation than Example 1, and the activated carbon of Example 7 had a total micropore vacuum 117 ml/g, where the proportion of the micropore volume having radii less than 8 angstroms was increased to 70%, corresponding to a micropore volume of 82 ml/g. Example 6 employed higher activation than Example 1, and the activated carbon of Example 6 had a total micropore volume of 327 ml/g, where the proportion of the micropore volume having radii less than 8 angstroms was decreased to 33%, corresponding to micropore volume of 108 ml/g. It is to be noticed that this value is lower than that in Example 1.

TABLE 2

| | | Material of Activated Carbon | Activation Gas (Vol %) $H_2O:CO_2:N_2:O_2$ | Total Micropore volume (ml/g) | Micropores having radii less than 8 angstroms | | Substance Carried on Activated Carbon | Mercury Adsorption, by Adsorbent (mg/g) | | | Adsorptivity of Organic Mercury | Substance Dissolved into Naphtha (mg/Kg) | | Overall Adsorption Performance |
|---|---|---|---|---|---|---|---|---|---|---|---|---|---|---|
| | | | | | Volume Proportion (%) | Volume (ml/g) | | Mercury Content in Naphtha (100 µg/Kg) | Same as left (10") | Same as left (1") | | | | |
| Example | 6 | Coconut Shell | 10:19.8:70:0.2 | 327 | 33 | 108 | HCl | 0.83 | 0.58 | 0.33 | ○ | Cl⁻ | 1> | ⊙ |
| " | 7 | Coconut Shell | 10:19.8:70:0.2 | 117 | 70 | 82 | HCl | 0.31 | 0.15 | 0.09 | ○ | Cl⁻ | 1> | ○ |
| " | 8 | Phenol resin | 10:19.8:70:0.2 | 564 | 25 | 141 | HCl | 0.55 | 0.35 | 0.22 | ○ | Cl⁻ | 1> | ○ |
| " | 9 | Phenol resin | 45:19.8:35:0.2 | 562 | 8 | 45 | HCl | 0.25 | 0.15 | 0.09 | ○ | Cl⁻ | 12 | Δ |
| " | 10 | Phenol resin Fiber | 30:19.8:50:0.2 | 329 | 45 | 148 | HCl | 1.53 | 1.10 | 0.82 | ○ | Cl⁻ | 1 | ⊙ |

Further, the mercury adsorption amount in Example 7 is ranked good, and the same in Example 6 is superior, and in both examples no organic mercury was found in naphtha after the adsorption.

Examples 8–10

As the carbonaceous material leading to the activated carbon, carbonized particle of phenol resin (Examples 8 and 9) and carbonized fiber of phenol resin (Example 10) were employed to prepare the activated carbon base and the steps of carrying hydrochloric acid, washing, and drying were carried out to finish the activated carbon carrying hydrochloric acid and then the mercury adsorption test was conducted in the same way as in Example 1.

Table 2 shows a description of the activated carbon carrying hydrochloric acid and the results of the mercury adsorption test. The adsorbent prepared in Example 10 from fibrous phenol resin had very large micropore volume having radii less than 8 angstroms at 148 ml/g, and the mercury adsorption amounts were 1.53, and 0.82 mg/g for mercury concentrations in light naphtha at 100, and 1 µg/kg, respectively. This is a superior result.

Examples 11–13

Sulfuric acid (Examples 11, 12) and phosphoric acid (Example 13) were employed as the acid carried by the activated carbon obtained in Example 1 and the mercury adsorption test was carried out in the same way as in Example 1. Table 3 shows description of such adsorbents carrying such inorganic acids and result of the mercury adsorption test.

TABLE 3

| | | Material of Activated Carbon | Activation Gas (Vol %) $H_2O:CO_2:N_2:O_2$ | Total Micropore volume (ml/g) | Micropores having radii less than 8 angstroms | | Substance Carried on Activated Carbon | Mercury Adsorption, by Adsorbent (mg/g) | | | Adsorptivity of Organic Mercury | Substance Dissolved into Naphtha (mg/Kg) | | Overall Adsorption Performance |
|---|---|---|---|---|---|---|---|---|---|---|---|---|---|---|
| | | | | | Volume Proportion (%) | Volume (ml/g) | | Mercury Content in Naphtha (100 µg/Kg) | Same as left (10") | Same as left (1") | | | | |
| Example | 11 | Coconut Shell | 30:19.8:50:0.2 | 282 | 38 | 107 | $H_2SO_4$ | 0.42 | 0.24 | 0.15 | ○ | $SO_4^{2-}$ | 1 | ○ |
| " | 12 | Coconut Shell | 55:19.8:25:0.2 | 280 | 15 | 42 | $H_2SO_4$ | 0.20 | 0.08 | 0.02 | ○ | $SO_4^{2-}$ | 20 | Δ |
| " | 13 | Coconut Shell | 30:19.8:50:0.2 | 282 | 38 | 107 | $H_3PO_4$ | 0.35 | 0.22 | 0.13 | ○ | $PO_4^{3-}$ | 1 | ○ |
| Comparative Example | 2 | Coconut Shell | 10:19.8:70:0.2 | 279 | 43 | 120 | sulfur | 0.58 | 0.15 | 0.08 | ○ | sulfur | 380 | X |

The activated carbons employed in Examples 11 and 13 were provided with the micropore volume having radii less than 8 angstroms at 107 ml/g and performed good adsorption, but as compared with the adsorbent carrying hydrochloric acid, the mercury adsorption amount is decreased. In addition, dissolution of acidic ions is increased. The activated carbon employed in Example 12 was provided with a fairly small micropore volume having radii less than 8 angstroms of 42 ml/g, and exhibited a decrease in the mercury adsorption.

Comparative Example 2

An adsorbent carrying sulfur was compared. Particle activated carbon obtained in Example 1 (100 g) was mixed with powdered sulfur (1 g) and heated to prepare the adsorbent carrying sulfur at 1% in amount, which was subjected to the mercury adsorption test in the same way in Example 1. Table 3 shows a description of the adsorbent carrying sulfur and the results of the mercury adsorption test.

This adsorbent carrying sulfur exhibits considerably good mercury adsorption, but exhibits a large dissolution of sulfur into naphtha as shown in Table 3. Accordingly, in view of the possible trouble or damage to catalysts used in oil process, this adsorbent is out of consideration as a mercury eliminator for naphtha.

Example 14

This illustrates a prototype field operation. A quantity of particle activated carbon carrying hydrochloric acid in the form of 10–32 mesh as prepared in Example 1 was packed in a adsorption lower (diameter: 25.4 cm, height 1 m) and light naphtha containing mercury at 7 μg/kg was passed at a flow rate [LV value (linear velocity): 0.25 m/min]. The result of analysis showed that the light naphtha output from the tower was nearly completely freed from mercury including organic mercury. Further the amount of chlorine ions dissolved into the naphtha was less than 0.1 mg/kg or at a trace level. That is, dissolution of chlorine ion was hardly found.

What is claimed is:

1. An adsorbent for adsorbing mercury or mercury compounds contained in liquid hydrocarbons, the adsorbent comprising an activated carbon containing hydrochloric acid, wherein the activated carbon has more than 80 ml/g of micropore volume having radii less than 8 angstroms.

2. The adsorbent as claimed in claim 1, wherein the activated carbon is manufactured by activating a carbonaceous material in an atmosphere containing less than 30 vol. % water vapor and then cooling in the same atmosphere to less than 300° C.

3. A process for removing mercury or mercury compounds from liquid hydrocarbons, comprising contacting the adsorbent as claimed in claim 2 with mercury containing hydrocarbons in liquid phase.

4. The process as claimed in claim 3, wherein the hydrocarbons comprise naphtha or intermediates of petrochemical products.

5. A process for removing mercury or mercury compounds from liquid hydrocarbons, comprising contacting the adsorbent as claimed in claim 1 with mercury containing hydrocarbons in liquid phase.

6. The process according to claim 5, wherein the hydrocarbons include naphtha and intermediates of oil products or petrochemical products.

7. The adsorbent as claimed in claim 1, wherein the activated carbon is manufactured by heat treating a previously activated carbon at a temperature over 500° C. in a gas composition comprising a least one of nitrogen gas and carbon dioxide gas, but with less than 2 vol. % oxygen or water vapor, and thereafter cooling in the same atmosphere to less than 300° C., wherein the previously activated carbon is previously activated in an atmosphere containing more than 15 vol. % water vapor and thereafter exposed to air while cooling.

8. A process for removing mercury or mercury compounds from liquid hydrocarbons, comprising contacting the adsorbent as claimed in claim 7 with mercury containing hydrocarbons in liquid phase.

9. The process as claimed in claim 8, wherein the hydrocarbons comprise naphtha or intermediates of petrochemical products.

10. The adsorbent as claimed in claim 1, in contact with naphtha or intermediates of petrochemical products.

* * * * *